(No Model.)
S. E. MARSH.
EAR CORN FEED REGULATOR.
No. 300,991. Patented June 24, 1884.
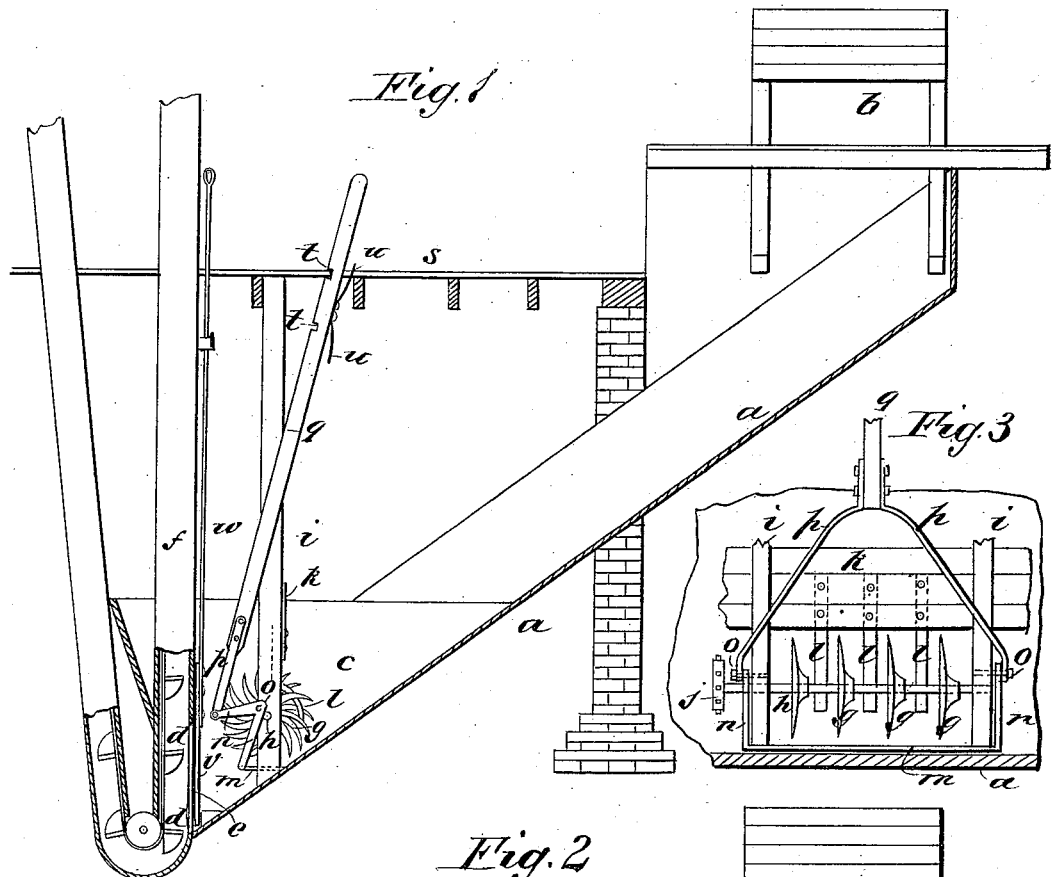
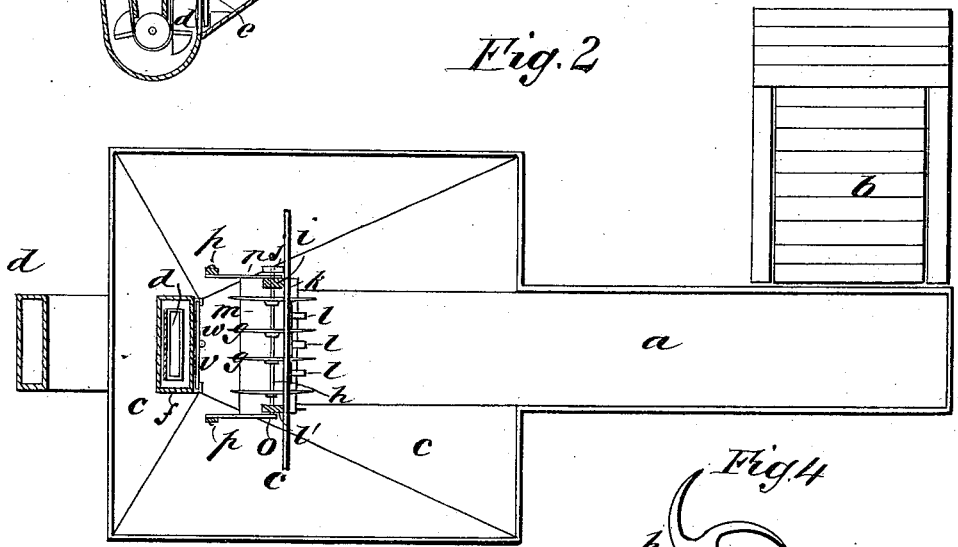
WITNESSES:
F. McArdle
C. Sedgwick
INVENTOR:
S. E. Marsh
BY Munn & Co.
ATTORNEYS.

UNITED STATES PATENT OFFICE.

SAMUEL E. MARSH, OF TARKIO, MISSOURI.

EAR-CORN FEED-REGULATOR.

SPECIFICATION forming part of Letters Patent No. 300,991, dated June 24, 1884.

Application filed April 3, 1884. (No model.)

*To all whom it may concern:*

Be it known that I, SAMUEL E. MARSH, of Tarkio, in the county of Atchison and State of Missouri, have invented a new and Improved Ear-Corn Elevator-Feeder, of which the following is a full, clear, and exact description.

My invention consists of pronged wheels and a discharging-shelf arranged with the chute and hopper of an elevator carrying-belt or the hopper of a storage-crib, as hereinafter described, for feeding ear-corn in regular and uninterrupted course to the buckets of the elevator, or from different sections of the crib.

Reference is to be had to the accompanying drawings, forming part of this specification, in which similar letters of reference indicate corresponding parts in all the figures.

Figure 1 is a sectional elevation of the elevator feeding-hopper and the improved apparatus which I propose to employ for feeding ear-corn. Fig. 2 is a horizontal section of the elevator and feed apparatus and plan of the feed-hopper and chute. Fig. 3 is a side elevation of the feed apparatus and section of the hopper. Fig. 4 is a side elevation of one of the feed-wheels, and Fig. 5 is a transverse section of one of the prongs of the feed-wheels.

At the lower end of the chute $a$, along which the corn slides from the dump $b$, to be delivered at the bottom of the hopper $c$ to the bucket $d$ of the elevator through the opening $e$ at the lower end of the ascending leg $f$, I arrange a series of toothed wheels, $g$, on a shaft, $k$, fitted in bearings of the standards $i$, suitably to be revolved by a chain belt running on the sprocket-wheel $j$, which is located on said shaft outside of the chute, where it may be geared by said chain with any available driver.

Above the wheels $g$, and extending on each side to the sides and bottom of the hopper $c$, I arrange a bulk-head, $k$, to prevent the corn from flowing over or around the wheels, and arrange guards $l$ between the wheels for preventing the ears from flowing between the wheels over the shaft $h$, and causing the corn-ears to be carried or pushed along mainly by the points of the teeth.

Under the wheels $g$, I arrange a shelf, $m$, tangential to the chute $a$, and over which the corn is to be pushed in a horizontal direction, so as to be carried away from the chute, and forming a ledge, from off which the corn-ears may be projected into the buckets of the elevator or into a horizontal or other conveyer from the points of the rake-wheels, by which the feed will be steady and uninterrupted by any such clogging as corn-ears are subject to in an ordinary feed-hopper. The points of the teeth also effectively prevent any clogging of the corn above the wheels by catching on the ears and drawing them down between the chute $a$ and the guards $l$.

For allowing the shelled corn that may collect on the chute $a$ above the feeder from time to time to escape, I attach the shelf $m$ to bell-cranks $n$—one at each end—which are pivoted at $o$ to the standards $i$, and are connected to the branches $p$ of an adjusting-bar, $q$, that extends up through the floor $s$ above the feeding-hopper to be set by its notches $t$ and springs $u$, according as the shelf is to be set for opening the passage for the shelled corn, or for adjusting it for the feeding of the corn-ears. A gate, $v$, is arranged with the opening $e$ into the elevator, and is provided with a rod, $w$, to be shifted as desired, for partly or wholly closing the passage $e$, as may be required, for limiting the flow of shelled corn, or other grain for which the elevator may be sometimes used.

The dumping device at $b$ may be of any approved form for tilting up the corn-ears, by which the corn is brought to the chute to empty them quickly, and need not be described.

I prefer to construct the teeth of the wheels $g$ with the forwardly-curved pitch represented in Figs. 1 and 4; but any approximate form may be employed, and the number of pronged wheels and the number of prongs in the wheels may be increased according to the required capacity of the feeder.

My improvements may easily be applied to storage-cribs having hopper bottoms and connected to a horizontal conveyer, and the shaft $h$, carrying the pronged wheels $g$, may be fitted to be shifted along to draw the corn from the crib at any desired point, and the conveyer may range alongside of a single crib, or between two cribs, as the desired storage capacity and room shall require.

Having thus described my invention, I claim as new and desire to secure by Letters Patent—

1. The revolving toothed wheels $g$, guards $l$, and shelf $m$, in combination with the chute $a$ and the elevator $d\ f$, substantially as described.

2. The revolving toothed wheels $g$, guards $l$, bulk-head $k$, and the shelf $m$, in combination with the chute $a$ and elevator $d\ f$, substantially as described.

3. The shelf $m$, combined with the chute $a$, wheels $g$, and elevator $d\ f$, connected to the adjusting-bar $q$, with bell-cranks $n$, substantially as described.

SAMUEL E. MARSH.

Witnesses:
 H. C. PAYNE,
 S. R. COWICK.